Patented May 11, 1937

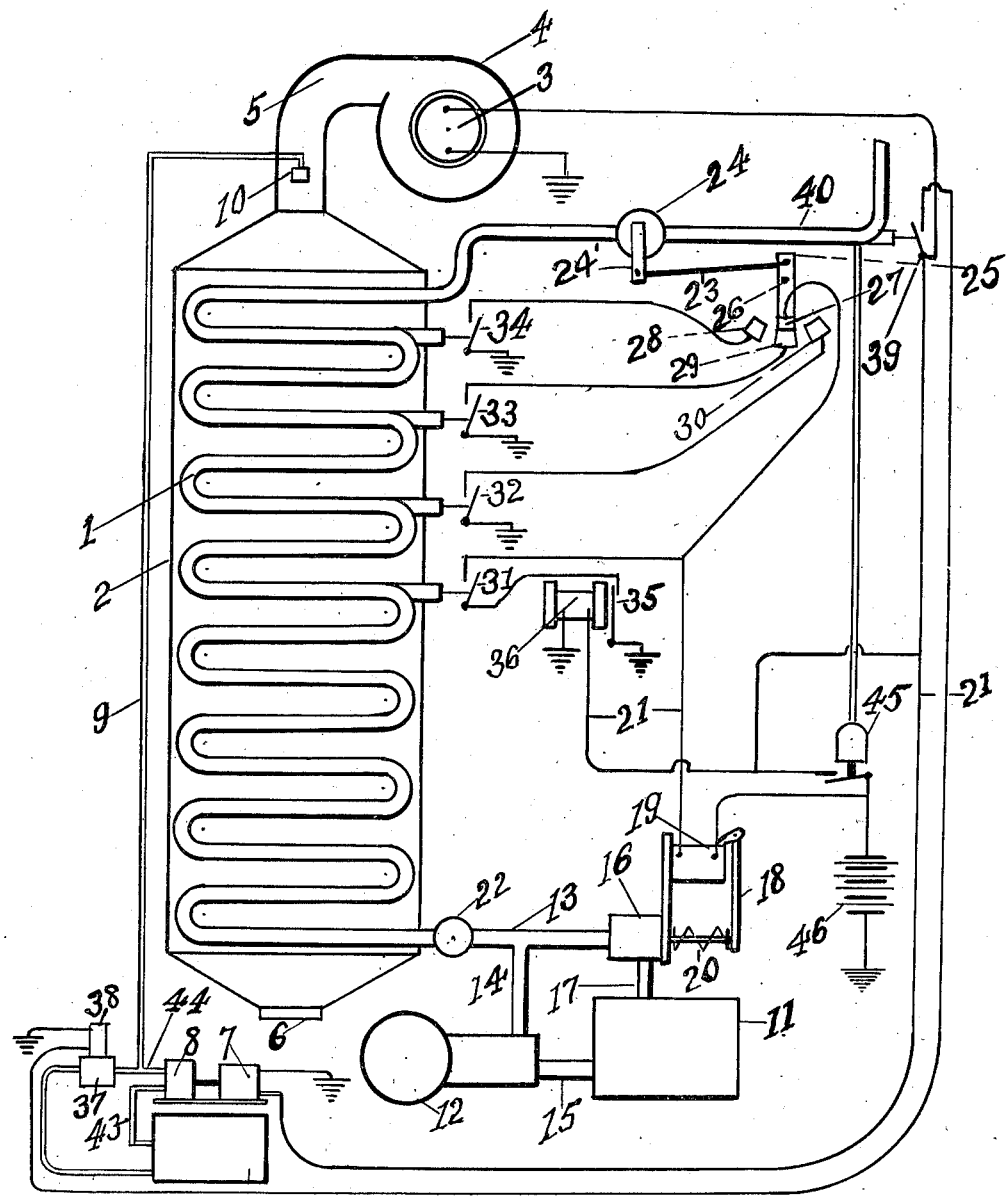

2,079,986

UNITED STATES PATENT OFFICE 2,079,986

METHOD AND APPARATUS FOR OPERATING STEAM GENERATORS

Osmon B. Campbell, St. Joseph, Mo.

Application August 24, 1936, Serial No. 97,666

7 Claims. (Cl. 122—448)

The invention relates to the once through type of steam generator and has for its object the production of superheated steam of approximately a predetermined temperature throughout the range of operation of the generator. The invention relates more particularly to the method of controlling the flow of water to the generator, as well as to the devices for effecting this control, and to the method and means for controlling the temperature of the heat supply.

When operating generators of the once through type, which were supplied intermittently with heat and which were supplied with water as required by the thermal conditions within the generator, I have found that the greatest fluctuations in the temperature of the delivered steam occur either during or immediately after periods when water is supplied to the generator, while no heat is being supplied thereto.

I have also found that, if a certain quantity of water is maintained in the generator, regardless of the amount of steam being produced, the temperature of the delivered steam will be highest when the amount of steam being produced is greatest.

I have also found that the proportion of fuel supplied to the combustible mixture has a marked bearing upon the temperature of the steam produced and that a mixture having an insufficient proportion of fuel and a considerable excess of air over that which is necessary for combustion, produces steam of lower temperature than a mixture of the proper proportions. This is largely due to the fact that the temperature of the products of combustion is lower, due to the excess of air, and to the lower rate of heat transfer to the hottest portion of the coil.

In my work with once through generators, I have obtained best results by observing the following principles:—The amount of water maintained in the generator should vary with the amount of steam being produced, being greatest when the amount of steam being produced is greatest; that water should be supplied only when heat is also being supplied, when the generator is producing more than a small percentage (about twenty percent) of its capacity; a certain minimum amount of water should be maintained in the generator during light load and if the amount falls below this minimum, water should be supplied continuously, regardless of the supply of heat. This is necessary because the period of operation of the heat supply, at light load, is such a small proportion of the cycle, that there would eventually be a deficiency of water in the generator, if the water were supplied only when heat was also being supplied. At light load, however, there is no objection to supplying water continuously and it is the only practical way to maintain the necessary amount of water in the generator.

When the water pumps are connected directly to the engine, they should have a comparatively large capacity in order to supply sufficient water at light load and slow engine speed, because of the fact that heat, and therefore water, is supplied for very short periods and the capacity of the pumps is reduced, due to the slow engine speed. To guard against any deficiency of water, however, it is provided that the pumps shall supply water continuously, when there is less than a certain amount of water in the generator. If, however, the operation of the pumps is independent of the engine, they need have a capacity equal to the maximum capacity of the generator to produce steam.

I do not attempt to control the rate of flow of water to the generator, but by the use of the several thermal switches, establish the position along the tube to which the water may advance for different amounts of steam being produced.

To accomplish the above method of operation, I have provided apparatus comprising a plurality of thermal-switches, located at various positions in the upper part of the generator, a selective switch actuated by a flow motor associated with the steam delivery pipe, a magnetic switch, and an electrically operated water valve, in operative relation to control the flow of water to the generator.

Referring to the drawing, I represents the generator coil, 2 a casing about said coil, 3 a motor driving the blower 4, for supplying air for combustion which passes through the passage 5 to the coils of the generator, 6 an opening for discharging the products of combustion from the generator, 7 a motor which drives the fuel pump 8, which furnishes fuel through the tube 9 to the nozzle 10 in the tube 5; 11 a tank for supplying water, 12 a water pump, 13, 14 and 15 pipes for connecting the generator, pump and supply tank, 16 a valve adapted to control the flow of water and direct it either to the generator through the pipe 13 or back to the supply tank through the pipe 17. This valve is actuated in one direction by the armature 18 of the electro-magnet 19 and in the opposite direction by the spring 20. 21 designates various electrical conductors.

When the magnet 19 is energized, the valve 16 is open and water will flow from the pump back to the supply tank through the pipe 17 and when the magnet is not energized, the valve will be closed and water will flow to the generator through the pipe 13. The check valve 22 prevents water from discharging from the generator. 23 designates a rod which connects the flow motor 24 with the lever 25 of the selective switch. Said lever is caused to swing about the pivot 26 by the action of the flow motor and carries the contact 27 which may be brought to engage any of the contacts 28, 29 or 30, depending upon the amount of steam flowing through the flow motor.

The thermal-switches 31, 32, 33 and 34 and the relay switch 35 control the flow of current through the coil of the electro-magnet 19. The thermal-switches may be of any well known type such as, for instance, a steel tube through which passes a brass rod, one end of which is fixed and the other end of which abuts the movable member of a switch, said tube and rod being subject to the temperature of the steam or water. These switches are arranged to close when influenced by water and to open when influenced by steam.

The relay switch 35 is a simple relay adapted to open a circuit when the coil is energized, said coil being in parallel circuit with the motors 3 and 7, so that when heat is being supplied to the generator, the coil of the relay will be energized and the switch opened.

When no current is flowing to the motors 3 and 7 and, therefore, no current passing through the coil 36 of the relay, and, if there is sufficient water in the generator to influence the thermal-switch 31 and close the same, the coil 19 will be energized and no water will be pumped to the generator, regardless of the condition of the other control circuits. If, however, current is flowing to the motors 3 and 7, the relay switch 35 will be open and the control of the water valve 16 will be subject to the position of that thermal-switch 32, 33 or 34 whose circuit is closed through the selective switch 25. When there is sufficient water in the generator to influence this switch, coil 19 will be energized and no water will be pumped to the generator.

If there is not enough water in the generator to influence thermal-switch 31, the circuit through the coil 19 will be broken by this switch and water will be pumped continuously to the generator, regardless of the position of the relay switch 35. 45 designates a pressure actuated switch which closes to cause heat to be supplied to the generator, when the pressure therein falls below a certain point. 46 designates a source of electrical energy, such as a battery.

The above mentioned flow motor is adapted to be influenced by the flow of steam from the generator and the flow of steam will cause the crank 24' of said flow motor to move to different positions corresponding to the amount of steam flowing and the connected rod 23 will communicate this movement to the switch 25, and cause said switch to contact points 28, 29, or 30, depending upon the amount of steam flowing; the point 28 being in contact, when the maximum amount of steam is flowing. Thermal switches 31, 32, 33, and 34 are influenced by conditions within the generator and determine the points in the generator at which water is maintained, under different loads. When switch 25 is in contact with point 28, water will be maintained somewhere below thermostat 34, when switch 25 is in contact with point 29, water will be maintained somewhere below thermostat 33, and when switch 25 is in contact with point 30, water will be maintained somewhere below thermostat 32. If the switch 32, 33, or 34, whose circuit is completed through switch 25, is closed, said switch is effective in preventing water from going to the generator, regardless of the condition of the circuit through the switch 31 and the magnetic switch 35. In the open position, however, these switches 32, 33, and 34 are subject to the condition of the circuit through switch 31 and switch 35. For instance, if switch 25 is in contact with point 28, and water is a little below thermal-switch 34, said switch 34 will be open. Water being above thermal-switch 31, said switch will be closed. Now, if pressure switch 45 is open, the coil 36 will not be energized, and the magnetic switch 35 will be closed. There is, therefore, a closed circuit afforded through coil 19, even though the switch 34 is open. This is the condition, when the pressure switch is open and therefore, no heat is being supplied to the generator. If, however, pressure switch 45 is closed, coil 36 will be energized and switch 35 will be open and water will be pumped to the generator.

When steam influences thermal-switch 31, said switch is open and water will be pumped to the generator, regardless of the position of magnetic switch 35. If, however, switch 31 is closed by the influence of water, this circuit is then under the control of magnetic switch 35, which, in turn, is subject to the pressure switch 45.

I claim:

1. In combination with a series steam generator having a long continuous tube and having means for supplying water thereto at one end and having grounded electrical means for supplying heat thereto, a first thermal-switch, which is responsive to temperature within the generator at a certain point, a plurality of additional thermal-switches, which are responsive to temperature within the generator at points successively farther along the tube than the first point, a relay switch, a pressure switch, means associated with the steam delivery pipe, adapted to actuate a selective switch, said selective switch being adapted to close a circuit through any of the several thermal-switches, except the first one above mentioned, a water control valve, electrical means controlling said valve, a grounded source of electrical energy, a circuit including the source of electrical energy, the electrical means controlling the water valve, the first thermal-switch, the relay switch and the ground; an electrical circuit including the source of energy, the electrical means controlling the water-valve, the selective switch, one of the thermal-switches, as determined by the position of the selective switch, and the ground; and a circuit from the source of energy to the pressure switch and thence in parallel to the coil of the relay and to the ground, and to the means for supplying heat to the generator and to the ground.

2. The method of operating a steam generator which comprises pumping water continuously to said generator, when there is less than a predetermined minimum amount of water therein, and pumping water intermittently to said generator, as the thermal conditions demand, only while heat is also being supplied to said generator, when there is a greater amount of water therein, than the above specified minimum amount.

3. The method of operating a steam generator which comprises furnishing water thereto as the thermal conditions therein demand, when heat is being supplied to said generator and preventing water from being supplied to said generator, when no heat is being supplied thereto, when there is more than a certain minimum amount of water in said generator.

4. The method of operating a series steam generator, which consists in maintaining water at a certain point therein, when a small amount of steam is being produced, and in maintaining water at points successively farther along in the tube, when successively greater amounts of steam are being produced, and limiting both the minimum and the maximum amounts of water, which may be present in the generator, regardless of the temperature of the steam.

5. In combination with a steam generator, having means for supplying water and heat thereto, and having more than one thermal-switch adapted to control the flow of water to said generator, a relay switch in series circuit with the first thermal-switch, and means for energizing the coil of the relay, when heat is being supplied to the generator.

6. The method of operating a series steam generator, which comprises maintaining a certain amount of water in said generator, when operating under light load, maintaining a greater amount of water in said generator, when operating under greater load, and limiting both the minimum and the maximum amounts of water, which may be present in said generator, regardless of the temperature of the steam.

7. The method of operating a series steam generator, which comprises maintaining water at a certain point therein when operating under light load, maintaining water farther along in the tube when operating under increased load, and preventing the water from advancing beyond a certain point in the tube when operating under maximum load, regardless of the temperature of the steam.

OSMON B. CAMPBELL.